United States Patent [19]

Kuwahara

[11] 4,319,080
[45] Mar. 9, 1982

[54] METHOD OF LOCATING FAULTY PULSE REPEATERS

[75] Inventor: Kiyoshi Kuwahara, Tokyo, Japan

[73] Assignee: Anritsu Electric Company Limited, Tokyo, Japan

[21] Appl. No.: 129,201

[22] Filed: Mar. 11, 1980

[30] Foreign Application Priority Data

Mar. 13, 1979 [JP] Japan .................. 54-28188

[51] Int. Cl.³ .................. H04B 3/46; H04B 1/60
[52] U.S. Cl. .................. 179/175.31 R
[58] Field of Search .......... 179/175.31 R, 175.3 R, 179/170 F

[56] References Cited

U.S. PATENT DOCUMENTS 3,083,270  3/1963  Mayo .................. 179/175.31 R
4,112,263  9/1978  Lender .................. 179/175.31 R Primary Examiner—T. A. Robinson
Attorney, Agent, or Firm—Holman & Stern

[57] ABSTRACT

A method of testing a plurality of repeaters arrayed along a transmission line of a pulse code modulation system, and of locating any faulty repeaters, both testing and fault location being performed automatically. Pulse train groups, each containing a frequency component corresponding to a supervisory signal frequency of one of the repeaters, are successively applied from one terminal of the transmission line. Each pulse train group comprises a plurality of subgroup pulse trains, each of which contains the supervisory frequency component of the pulse train group to which it belongs, with the density of a pulse train in successive subgroups being successively increased. Any faulty repeater is located by determining the pulse train density at which a supervisory signal produced by the repeater fails to increase by a predetermined amount for a known change in pulse train density.

4 Claims, 8 Drawing Figures

METHOD OF LOCATING FAULTY PULSE REPEATERS

BACKGROUND OF THE INVENTION

The present invention is directed toward a method of automatically testing a plurality of repeaters connected along a pulse code modulation transmission route.

A transmission line of a pulse code modulation system (hereinafter referred to as PCM system) includes a number of repeaters provided at regular intervals, to perform regeneration of signal pulses. A known method of testing such repeaters, and of locating a faulty repeater, is based upon providing a filter at the output of each repeater, with each filter being of band-pass type, for selecting an individual frequency from a frequency component which can be included in a pulse train applied to the repeater. The frequency which is selected by a filter is referred to as the supervisory frequency, and an individual supervisory frequency is thus allocated to each of the repeaters. The outputs from these filters are connected in common to a return transmission path. In order to locate the position of a faulty or inoperative repeater, a pulse train containing a frequency component identical to the supervisory frequency of a first one of the repeaters is applied from a terminal of the transmission line. If a supervisory signal is sent back along the return transmission path, then this indicates that the corresponding repeater is operative. A pulse train containing a frequency component identical to that of the supervisory frequency of the next succeeding repeater is then applied from the terminal to the transmission line. This process is repeated until a repeater is found for which no supervisory signal is sent back along the return transmission path, or for which the level of the supervisory signal returned is below a predetermined level. This indicates that the corresponding repeater is faulty. Since the supervisory frequency is known, the location of the faulty repeater is thereby determined.

By a slight modification of this method, the operating margin of each repeater along a transmission line can be measured. This is accomplished by successively increasing the density of a pulse train in the signal applied to the transmission line. Polarity alternation of the pulse train serves to produce the supervisory signal component of the applied signal, and increasing the density thereof should produce a corresponding increase in the amplitude of the supervisory signal returned by a repeater. If, for a known change in the density of the pulse train, the amplitude of the resultant increase in the supervisory signal is below a predetermined level, then this indicates that the supervisory signal component of the applied signal is causing the repeater concerned to make a large number of errors, i.e. misjudgements of the signal pulses applied thereto. The point at which this occurs serves to indicate the degree to which each repeater is operating to the design specification, i.e. the degree of disturbance in the input signal pulses up to which the repeater will continue to successfully regenerate these pulses.

Such prior art methods are performed manually. In other words, an operator selects each of the supervisory signal frequencies in turn and applies a corresponding test signal to the transmission line, to successively test the various repeaters. In the case of a line having a large number of repeaters, this is a time-consuming process. The method of the present invention overcomes this problem by testing each repeater, and measuring its operating margin, completely automatically,

SUMMARY OF THE INVENTION

In the method of the present invention, each of a plurality of repeaters along a transmission line of a PCM system is provided with a bandpass filter at the output of the repeater, with the bandpass filter being tuned to pass a particular supervisory frequency, individual to that repeater. A test signal is generated and is applied from a terminal to one end of the transmission line. This test signal is composed of a set of pulse train groups each of which contains a frequency component which is identical to one of the supervisory frequencies. Each of the pulse train group comprises a plurality of subgroup pulse trains, with each of the subgroup pulse trains being composed of groups of pulses. The density of the pulse train is successively increased, in successive subgroups of a pulse train group, but each of the subgroups in a particular pulse train groups contains the supervisory frequency component peculiar to that pulse train group. When a pulse train group in the test signal reaches a repeater whose supervisory frequency is identical to the frequency component in that pulse train group, a supervisory signal is produced by the bandpass filter coupled to that repeater, and this signal is sent along a return transmission path back to the testing terminal. Absence of the supervisory signal from a repeater indicates that the repeater concerned in non-operative. In the case of an operative repeater, the particular subgroup within the pulse train group for which the supervisory signal ceases to increase in a predetermined manner indicates the operating margin of that repeater, i.e. the degree to which the repeater will accurately regenerate input signal pulses when a certain level of disturbance is applied to these input signal pulses.

Generation of the pulse train groups is repetitively performed in a time-sharing manner, completely automatically. Since the timings at which the various pulse train groups and the subgroups are produced are accurately known, the detection and location of faulty repeaters, and determination of the operating margin of each repeater, can be automatically performed, and the results recorded or displayed.

DESCRIPTION OF THE PREFERRED EMBODIMENT

Figure 1:
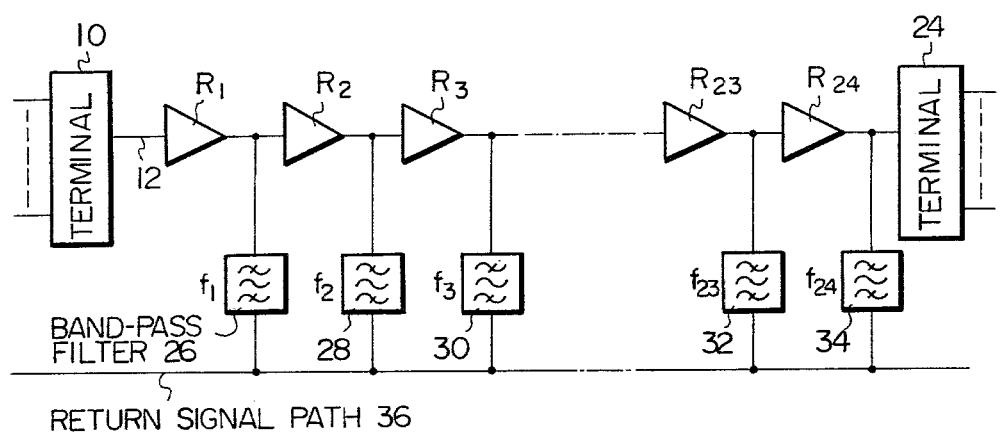
FIG. 1 is a simplified block diagram of a PCM transmission line equipped with supervisory filters.

Referring first to FIG. 1, a simplified block diagram of a PCM transmission system is shown. Reference numeral 10 denotes a terminal, from which PCM signals are transmitted to a transmission line 12. A number of repeaters, denoted by numerals $R_1$, $R_2$, $R_3$–$R_{23}$, $R_{24}$, are incorporated in transmission line 12 at periodic intervals, to regenerate the PCM signals. It will be assumed that there are a total of 24 repeaters along transmission line 12. A band-pass filter is connected to the output of each of the repeaters $R_1$ to $R_{24}$, as denoted by numerals 26, 28, 30,-32 and 34. Each of these band-pass filters passes a different predetermined frequency, which will be referred to as $f_1$, $f_2$, $f_3$–$f_{23}$, $f_{24}$. These are referred to as supervisory frequencies, and the output signal from such a band-pass filter will be referred to in the following description as a supervisory signal.

Figure 2:
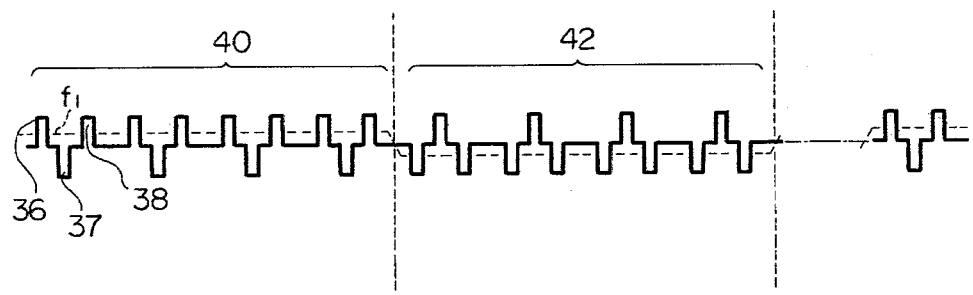
FIG. 2 is a waveform diagram illustrating a test signal of a prior art method for testing the system of FIG. 1.

FIG. 2 is a waveform diagram of a test signal which can be used to test the repeaters $R_1$ to $R_{24}$, by a conventional test method. This test signal may be thought of as consisting of a number of successive sets of three pulses, or pulse trio patterns, as indicated by numerals 36, 37 and 38 in FIG. 2. During a portion of the test signal, as indicated by numeral 40, these pulse triplets are arranged such that there is a greater density of positive-going pulses than negative-going pulses. As a result, when such a test signal is sent along transmission line 12, the signal actually appearing at the input to a repeater will have a positive DC component, as indicated by the broken line in portion 40 of the test signal. During a succeeding portion of the test signal, as indicated by numeral 42, the pulse triplets are arranged such that there is a greater density of negative-going pulses than of positive-going pulses. As a result, the signal actually appearing at the input to a repeater will have a negative DC component, as indicated by the broken line in portion 42 of the test signal. By successive alternation of test signal portions such as portions 40 and 42 in FIG. 2, a predetermined low frequency component is incorporated into the test signal. In order to test the repeaters $R_1$ to $R_{24}$ by a conventional manual method, this frequency component of the test signal is first made identical to $f_1$, i.e. to the supervisory frequency of the first repeater $R_1$. The outputs of each of the band-pass filters 26 to 34 is connected to a return signal path, denoted by numeral 36.

The amplitude of the supervisory frequency component of the test signal is first set to a low value. This can be accomplished by reducing the density of pulse trio patterns contained in the test signal i.e. the density of pulse triplets such as 36, 37 and 38 shown in FIG. 2. The test signal is then applied to transmission line 12, and a check is made as to whether the supervisory signal which is thereby output by band-pass filter 26 and sent back along return path 36 is above a predetermined level. The density of pulse trio patterns is thereafter gradually or stepwise increased, until a point is reached at which the amount of disturbance imparted to the input pulses applied to repeater $R_1$ by the supervisory frequency component of the test signal is so great that errors begin to be produced by repeater $R_1$. This point is indicated by the fact that a predetermined increase in the density of the pulse trio patterns contained in the test signal does not produce a corresponding increase in the amplitude of the supervisory signal which is sent back. This level of density of the pulse trio patterns of the test signal serves as a measure of the operating margin of the repeater $R_1$, i.e. of the amount of noise or other disturbance which is tolerable in the signal applied to the repeater before the repeater begins to produce errors. If this operating margin is above a predetermined value, then the repeater is adjudged to be operating in a satisfactory manner. Once the first repeater $R_1$ has been tested in this way and found to be satisfactory, the frequency component in the test signal is changed to the supervisory frequency of repeater $R_2$, which is then tested in the manner described above for repeater $R_1$.

In this way each of the repeaters $R_1$ to $R_{24}$ can be successively checked in an individual manner. Such a method of testing is disclosed in U.S. Pat. No. 3,083,270 by Mayo.

It will be apparent that the method described above is time-consuming and troublesome, particularly when a large number of repeaters are contained in a system and it is essential to locate any faulty repeater in the shortest possible time. With the method disclosed in the present invention, such detection of a faulty repeater is performed completely automatically and very rapidly.

Before describing the present invention, some of the technical terms used in the description will be first defined. The term "fault locating reference signal" means a signal comprising a pulse train which does not contain any frequency component corresponding to a supervisory frequency. Such a signal, for example, is typified by a simple succession of bipolar pulse pairs. The term "fault locating reference signal" will also be applicable to a signal of zero potential, i.e. a signal which contains no AC or DC component, referred to as a "zero" signal. The terms "successively" or "in succession", as used herein include the meaning of "in irregular succession", i.e. as when referring to an operation which proceeds in steps of unequal duration, as well as the meaning of "in regular succession". The terms "operating margin" and "supervisory signal" will have the meanings defined hereinabove in the description of a prior art test method.

Figure 3A:
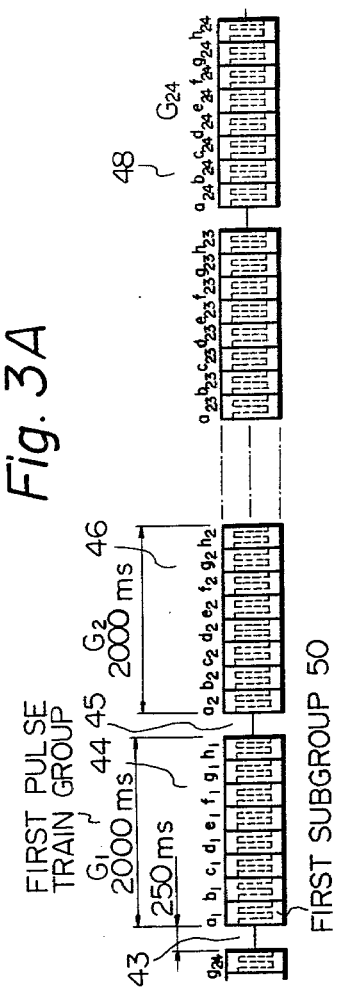
FIGS. 3A, 3B, 3C, and 3D show diagrams illustrating the composition of a test signal according to the present invention.
Figure 3B:
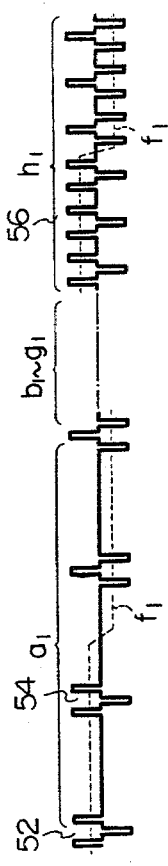

Referring first to FIG. 3(a), an example is shown therein of the configuration of an example of a test signal according to the present invention. This signal is based on the time sharing principle, and consists of various pulse trains each of which is contained in a time slot of predetermined duration and timing. Numerals 44, 46,-and 48 designate a set of 24 pulse train groups G1 to G24 which are successively generated, and which each occupy a time slot of predetermined duration, for example 2000 milliseconds. An interval of the order of for example 250 millisecond is provided between each of the pulse train groups. Each pulse train group is composed of a number of pulse train subgroups (abbreviated hereinafter to subgroups, for brevity). These subgroups are designated as $a_1$ to $n_1$ in pulse train group G1, as $a_2$ to $h_2$ in pulse train G2, and so on, as shown in FIG. 3(a). The configuration of a typical pulse train group, e.g. pulse train group G1, is illustrated in FIG. 3(b). Each of the subgroups is composed of trio patterns, as indicated by numerals 52 and 54, which are periodically reversed in polarity so as to produce a low frequency component in the pulse train group, corresponding to the supervisory frequency of a repeater. In the case of pulse train group G1 illustrated in FIG. 3(a), the frequency of this component is $f_1$. The density of the pulse train, and hence the density of pulse trio patterns, is increased in a stepwise manner in successive subgroups $a_1$, $b_1$, $c_1$ etc. Thus, the amplitude of the low frequency signal component contained in the pulse train group successively increases in a predetermined manner for successive subgroups in that pulse train group. The composition of the various pulse train groups may be expressed as: $G1=(a_1, b_1,-,h_1)$, $G2=(a_2, b_2,-h_2)$, ... $G24=(a_{24}, b_{24},-h_{24})$.

Thus, each of the pulse train groups G1 to G24 contains a different supervisory frequency component, with the density of pulse trio patterns contained in each pulse train group increasing in a predetermined stepwise manner during that pulse train group. It should be noted here that it is equally possible to arrange that the density of pulse trio patterns decreases in a stepwise manner, from the start of a pulse train group.

Figure 3C:
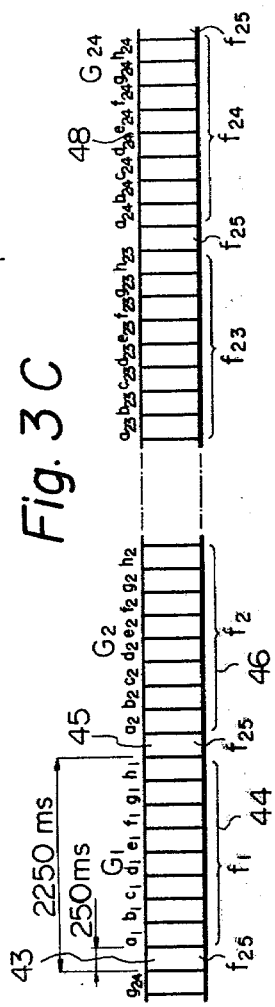
Figure 3D:

In the example of FIG. 3(a), the intervals between each of the pulse train groups G1 to G24 contain a "zero" signal. This may be satisfactory in some cases, but it may be preferable, in order to reduce the effects of abrupt cessations of the test signal pulses upon the line response characteristics, to provide a fault locating reference signal composed of a pulse train which, as explained hereinabove, does not contain the supervisory frequency components, between each of the pulse train groups. In other words, the repetition frequency of this fault locating reference signal, which can be designated as f25, is different from the supervisory frequencies f1 to f24 of the repeaters on the transmission line. Such an arrangement is illustrated in FIG. 3(c). An example of a suitable signal for use as the fault locating reference signal, consisting of a train of bipolar pulse pairs, is shown in FIG. 3(d).

A test signal such as that shown in FIG. 3(c) is used as follows, according to the method of the present invention. When the test signal is first applied to the transmission line 12 (in FIG. 1), the level of output produced from repeater $R_1$ and passed through filter 26 during a fault location reference signal interval, as denoted by numeral 44 in FIG. 3(c), is measured by means such as a selective level meter coupled to the return signal path 36. This output level is then stored in some type of memory means. During the first of the subgroups of the first pulse train group G1, i.e. subgroup $a_1$, the supervisory signal level which is output from filter 26 is measured and memorized and the difference in level between this output level and the previously stored output level is determined. If this level difference exceeds a predetermined value, such as for example 0.5 dB, then the repeater $R_1$ is adjudged to be operating in a satisfactory manner. The second subgroup of pulse train group G1, i.e. subgroup $b_1$, then is applied to repeater $R_1$. Subgroup $b_1$ has a greater density of the pulse trio patterns than subgroup $a_1$, so that the level of the supervisory signal output from band-pass filter 26 should be greater than that which is output during subgroup $a_1$. The memorized supervisory signal output level during subgroup $a_1$, which we can designate as A is therefore subtracted from the value which appears during subgroup $b_1$, which we can designate as B, in other words a level difference B - A is measured. If this level difference is, for example, within ±0.5 dB with respect to a predetermined level difference, then the repeater $R_1$ is adjudged at this stage to be operating in a satisfactory manner. Subgroup $c_1$ of pulse train group G1 then is input to repeater $R_1$. This subgroup has a higher density of the pulse trio patterns than subgroup $b_1$, so that the amplitude of the supervisory signal at frequency f1 should be higher than for subgroups $b_1$ and $a_1$. The level difference C - A is then measured, where C is the level of supervisory signal sent back from band-pass filter 26 during subgroup $c_1$. If the level difference C - A is within a predetermined range in relation to a prescribed level difference value, then the operating margin of repeater $R_1$ is adjudged to be satisfactory at this stage.

This process is successively carried out by means of the succeeding subgroups $d_1$, $e_1$ – $h_1$, in which the frequency component at the supervisory frequency of repeater $R_1$, i.e. frequency f1, successively increases in amplitude, with increasing density of the pulse trio patterns in each subgroup. In this way, the operating margin of repeater $R_1$ is sequentially checked for increasing values of pulse trio density in the test signal. It can be seen from the above that the output signal from band-pass filter 26 which results from application of subgroup $a_1$ to repeater $R_1$, i.e. output level A, is used as a reference level, to which the supervisory signal output levels B, C etc during the succeeding subgroups are compared.

When testing of first repeater $R_1$ has been completed, i.e. upon the termination of subgroup $h_1$ of pulse train group G1, then testing of the next repeater along transmission line 12, i.e. repeater $R_2$, is begun. This is carried out at the supervisory signal frequency f2, by means of subgroups $a_2$ to $h_2$ in pulse train group G2. This testing process is performed in exactly the same manner as described above for repeater $R_1$. In this manner, each of the repeaters $R_1$ to $R_{24}$ is successively tested. It should be noted that, instead of using the output level of supervisory signal produced during the first subgroup of a pulse train group, e.g. output level A referred to above, as a reference output level, it is also possible to use the level of supervisory signal produced during one of the other subgroups of a pulse train group as the reference level.

When a repeater is found to be non-operational by the first part of the test process described above, i.e. if the level of output from the band-pass filter of a repeater during the first subgroup of the corresponding pulse train group does not exceed the output level during the preceding interval of fault location reference signal by the prescribed amount, then the repeater is adjudged to be faulty, and no further testing of it is performed. In this case, testing of the next repeater is automatically and immediately initiated. In the case of a repeater for which the operating margin is found to be below the predetermined limit, as a result of the increasing unipolar pulse density test, either of two actions may be taken. Testing of the repeater in question may be continued until the end of the subgroups in the corresponding pulse train group. Or, when a repeater is found to have an unsatisfactory operating margin, further testing of that repeater may be immediately and automatically terminated, and testing of the next repeater of the transmission line initiated.

Figure 4A:
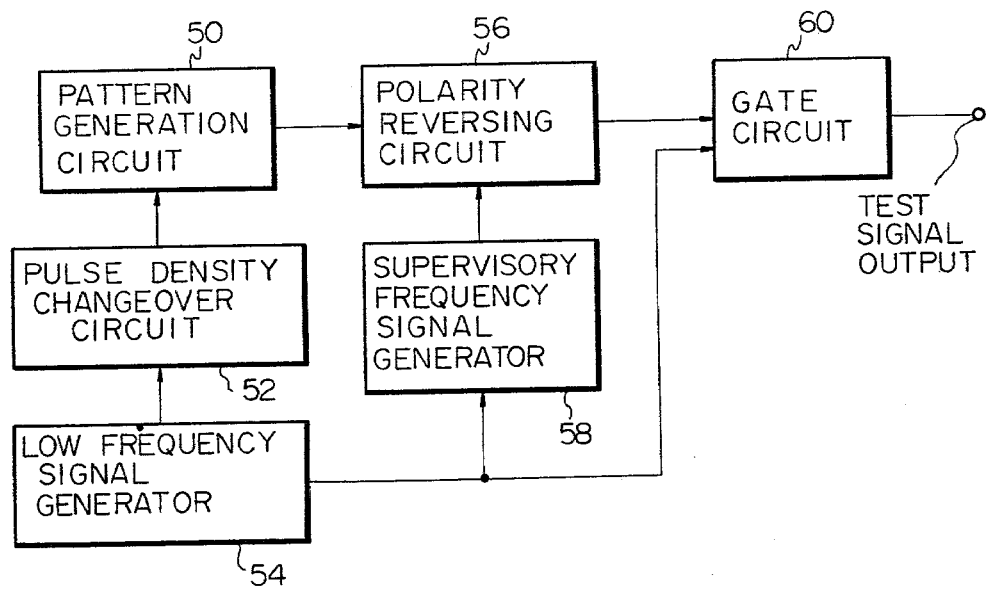
FIG. 4A and FIG. 4B are block diagrams of systems for generating a test signal according to the method of the present invention and for measuring and displaying the results of testing.
Figure 4B:
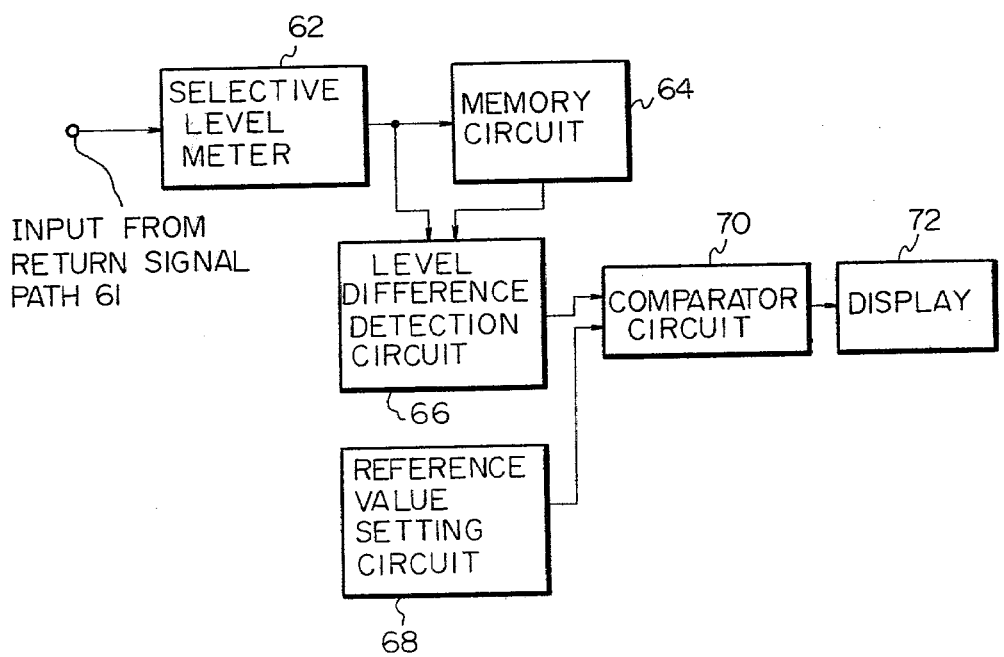

FIGS. 4A and 4B show an embodiment of a test system for implementing the method of the present invention, in simplified block diagram form. In FIG. 4A, numeral 54 denotes a low frequency signal generator circuit which serves to determine the timing of the test signal to be applied to the transmission line. Circuit 54 can generate, for example, a rectangular wave signal having a duty cycle of 1/9 and having a pulse duration of 2250 ms. A pattern generation circuit 50 generates continous pulse trains comprised of pulse triplets, as described hereinabove with respect to FIG. 3(b). The density of the pulse triplets in the output signal from pattern generation circuit 50, and hence the density of the pulse trio patterns in that signal, is controlled by an output signal from a pulse density changeover circuit 52. The latter output signal causes the unipolar pulse density in the output signal from pattern generation circuit 50 to be incremented in a stepwise manner, to thereby form the various subgroups within each of the pulse train groups of the test signal. The polarity of the pulse triplets in the output signal from pattern generation circuit 50 is repetitively reversed by means of a polarity reversing circuit 56, in response to a rectangular wave signal at the supervisory frequencies which is applied thereto from a supervisory frequency signal generator 58. In this way, each of the pulse train groups is made to contain a corresponding supervisory frequency component, each corresponding to an individual repeater, as described hereinabove. The signal thus produced by polarity reversing circuit 56 is applied to a gate circuit which is controlled by an output of low frequency signal generator circuit 54. This serves to insert an interval of, for example 250 ms, between each of the pulse train groups. In the embodiment of FIG. 4A, it is assumed that a "zero" signal is provided between each of the pulse train groups. However it will be apparent that the arrangement of FIG. 4A may be readily modified to insert some other fault location reference signal between each of the pulse groups.

The system of FIG. 4A produces a test signal which is applied to the transmission line to successively test each of the repeaters thereon, as described above. The system of FIG. 4B is coupled at an input terminal 61 to the return signal path of the transmission line, to receive supervisory signals sent back thereon. This system includes a selective level meter 62, which receives the supervisory signals from the band-pass filter at the output of each repeater. Selective level meter 62 may be composed of, for example, a mixer circuit, a band-pass filter and a detector, and serves to measure the levels of the supervisory signals. The results of this measurement are output from selective level meter 62 and applied to a memory circuit 64 and to a level difference detection circuit 66. Memory circuit 64 serves to store the level measured by selective level meter 62 during the interval of fault location reference signal which precedes a pulse train group, and to further memorize the level measured by selective level meter 62 during a succeeding subgroup of that pulse train group, such as the first subgroup (e.g. $a_1$ in the case of pulse train group G1 as described hereinabove). Level difference detection circuit 66 serves to measure the difference in levels between the stored value for the fault location reference signal portion which has been stored in memory circuit 64 as described above and the level which is measured by selective level meter 62 during the succeeding first subgroup of the next pulse train group. An output signal is produced by level difference detection circuit 66 to indicate the value of the level difference which is found. Level difference detection circuit 66 then measures the difference in level between the stored value of level during the first subgroup of the current pulse train group and the output from selective level meter 62 during the second subgroup of that pulse train group. An output signal is then produced by level difference detection circuit to indicate the value of the level difference thus found. This procedure is then repeated for each of the succeeding subgroups in the pulse train group which is currently being applied to the transmission line, i.e. the level which is measured by selective level meter 62 during each of the subgroups has the stored level which was measured for a reference subgroup (e.g. the first of the subgroups in the pulse train group) subtracted from it, and the resultant level difference value is output from level difference detection circuit 66.

The output signals from level difference detection circuit 66, which may consist of a differential amplifier circuit, for example, are applied to a comparator circuit 70. The level difference values thus applied to comparator circuit 70 are compared therein with reference values, which are applied at appropriate timings to comparator circuit 70 from a reference value setting circuit 68. Output signals are produced by comparator circuit 70 to indicate whether the results of comparison between the level difference values from level difference detection circuit 66 and the reference values from reference value setting circuit 68 are satisfactory or unsatisfactory, i.e. to indicate whether the performance of each of the repeaters tested is satisfactory or unsatisfactory. These output signals from comparator circuit 70 are applied to a display 72, which indicates whether each of the repeaters is operating in a satisfactory manner by, for example, displaying "GO" or "NO GO". The operation of reference value setting circuit 68 and display 72 is of course synchronized with the test signal produced from the system of FIG. 4A. This may be accomplished by controlling the timing of operation of the system of FIG. 4B by means of output signals from low frequency signal generator 54 and supervisory frequency signal generator 58 in the system of FIG. 4A, by means of digital circuit techniques which are well known in the art.

From the above description it will be understood that the method of the present invention, when implemented by means of systems such as are shown in FIGS. 4A and 4B, enables rapid and automatic testing of a plurality of repeaters on a PCM transmission line for operational status and for operating margin, by applying subgroups containing pulse trio patterns which are increased in density in a successive stepwise manner to each of the repeaters, in a time sharing mode of operation. Initiation of the test operation may be manually or automatically performed, and once testing has been initiated, no further manual intervention is required, At completion of the test, the operational status of each repeater can be viewed on a display, so that recognition of the location of a faulty repeater can be immediately performed, obviating the time consuming manual procedures which are involved in conventional methods of testing a plurality of repeaters along a PCM transmission line.

It should be noted that various changes and modifications may be made to the method of the present invention as described hereinabove, which fall within the scope claimed for the present invention.

What is claimed is:

1. A method of locating a defectively functioning one of a plurality of pulse repeaters arrayed along a transmission line, each of said repeaters being provided with a band-pass filter coupled to an output terminal thereof for passing a supervisory signal having a supervisory frequency which is individual to said repeater, comprising the steps of:

applying to one end of said transmission line a test signal consisting of successively generated pulse train groups $G_1$ to $G_n$, each of said pulse train groups containing a frequency component equal to one of said supervisory frequencies, said pulse train groups $G_1$ to $G_n$ being composed of corresponding subgroups ($a_1$, $b_1$, $-h_1$; $a_2$, $b_2$, $-h_2$, $-a_n$, $b_n$, $-h_n$ with each of said subgroups constituting a pulse train group being composed of a plurality of bipolar pulse pairs and a plurality of pulse trains, with the density of said pulse trains in successive ones of said subgroups in a pulse train group being varied in a stepwise manner, periodic alternation of the polarity of said pulse trains being performed to provide said supervisory frequency component in said pulse train group, and a fault locating reference signal inserted between adjacent ones of said pulse train groups $G_1$ to $G_n$;

measuring the level of an output signal from a band-pass filter of a first one of said repeaters when said fault locating reference signal is being applied to said first repeater, and memorizing said level;

measuring the level of a supervisory signal output from said band-pass filter of said first repeater when a first subgroup of a pulse train group containing a supervisory frequency corresponding to said first repeater is applied to said first repeater, and memorizing said level;

subtracting said output signal level from said supervisory signal level to produce a first level difference;

comparing said first level difference with a predetermined level difference reference value, and adjudging said first repeater to be operational if said first level difference is found to be within a predetermined range with respect to said level difference reference value and adjudging said first repeater to be non-operational if said first level difference is found to be outside said predetermined range;

successively measuring the level of supervisory signal output from said band-pass filter of said first repeater while each of said subgroups of said pulse train group subsequent to said first subgroup is being applied to said first repeater, measuring the level difference between each of said measured levels of supervisory signal and a level of a selected one of said subgroups, said level of said selected one of said subgroups serving as a reference output level, comparing each successive level difference thus measured with a corresponding level difference reference value, and adjudging the operating margin of said first repeater based on the results of said successive comparisons of said successive level differences; and repetition of the above-mentioned steps for each of said repeaters following said first repeater when a pulse train group containing a supervisory signal frequency corresponding to each of said repeaters is applied thereto.

2. A method of sequentially and automatically testing a plurality of pulse repeaters arrayed along a transmission line to locate a defectively functioning one of said plurality of pulse repeaters, each of said pulse repeaters being provided with a band-pass filter coupled to an output terminal thereof for passing a supervisory signal having a supervisory frequency which is individual to that repeater, comprising the steps of:

generating and applying to one end of said transmission line a test signal consisting of successively generated pulse train groups $G_1$ to $G_n$, each of said pulse train groups being of predetermined fixed duration and composed of a plurality of subgroups which are also of predetermined fixed duration, each of said subgroups within a pulse train group being composed of a plurality of pulse triplets each comprising a bipolar pulse pair and a unipolar pulse, with the polarity of the unipolar pulses within each of said subgroups of a pulse train group undergoing alternation of polarity at a frequency equal to the supervisory frequency of one of said pulse repeaters, whereby a supervisory signal component having a frequency equal to the supervisory frequency of a corresponding one of said pulse repeaters is incorporated into each of said pulse train groups, with the frequency component of a first pulse train group $G_1$ being equal to the supervisory frequency of a first one of said pulse repeaters on said transmission line, the frequency component of a second pulse train group $G_2$ being equal to the supervisory frequency of a second one of said pulse repeaters, and so on, and with the density of said pulse triplets in successive ones of said subgroups comprising a pulse train group increasing in a successive stepwise manner throughout said pulse train group, said test signal further comprising a fault location reference signal generated for a predetermined duration between each of said pulse train groups, said fault location reference signal being characterized in that no frequency components corresponding to any of said supervisory frequencies are contained therein;

measuring a first output signal level produced from the band-pass filter of said first repeater during an interval in which said fault location reference signal is being applied to said transmission line, and memorizing said first output signal level;

measuring a second output signal level produced from the band-pass filter of the first repeater when a first subgroup of said first pulse train group is being applied to said transmission line, and memorizing said second output signal level;

subtracting said first output signal level from said second output signal level to produce a first signal level difference;

comparing said first signal level difference with a first signal level difference value and adjudging said first pulse repeater to be operational or nonoperational on the basis of said comparison;

successively measuring the level of supervisory signal output from said band-pass filter of said first repeater while each of said subgroups of said pulse train group subsequent to said first subgroup is being applied to said first repeater, measuring the level difference between each of said measured levels of supervisory signal and a level of selected one of said subgroups, said level of said selected one of said subgroups serving as a reference output level, comparing each successive level difference thus measured with a corresponding level difference reference value, and adjudging the operating margin of said first repeater based on the results of said successive comparisons of said successive level difference;

and repetition of the above-mentioned steps for each of said repeaters following said first repeater when a pulse train group containing a supervisory signal frequency corresponding to each of said repeaters is applied thereto.

3. A method of sequentially and automatically testing a plurality of pulse repeaters according to claim 2, wherein said fault location reference signal has a level of zero.

4. A method of sequentially and automatically testing a plurality of pulse repeaters according to claim 2, in which said fault location reference signal comprises a train of bipolar pulses.

* * * * *